(12) United States Patent
Ozaki (10) Patent No.: US 11,366,438 B2
(45) Date of Patent: Jun. 21, 2022

(54) ENVIRONMENT CONTROL SYSTEM AND ENVIRONMENT CONTROL METHOD

(71) Applicant: Panasonic Intellectual Property Management Co., Ltd., Osaka (JP)

(72) Inventor: Yuuji Ozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 335 days.

(21) Appl. No.: 16/486,758

(22) PCT Filed: Jan. 25, 2018

(86) PCT No.: PCT/JP2018/002262
§ 371 (c)(1),
(2) Date: Aug. 16, 2019

(87) PCT Pub. No.: WO2018/179750
PCT Pub. Date: Oct. 4, 2018

(65) Prior Publication Data
US 2019/0360718 A1 Nov. 28, 2019

(30) Foreign Application Priority Data
Mar. 28, 2017 (JP) .............................. JP2017-063890

(51) Int. Cl.
*G05B 17/00* (2006.01)
*F24F 11/74* (2018.01)
(Continued)

(52) U.S. Cl.
CPC ............. *G05B 17/00* (2013.01); *F24F 11/49* (2018.01); *F24F 11/74* (2018.01); *F24F 13/06* (2013.01); *F24F 13/26* (2013.01); *F24F 13/32* (2013.01); *G05B 13/04* (2013.01); *G05B 17/02* (2013.01)

(58) Field of Classification Search
CPC ........ G05B 17/00; G05B 13/04; G05B 17/02; F24F 11/74; F24F 11/49; F24F 13/06;
(Continued)

(56) References Cited

U.S. PATENT DOCUMENTS

| 2012/0323376 A1 | 12/2012 | Honda et al. |
| 2014/0257740 A1* | 9/2014 | Hamann .................. G01K 1/02 702/130 |

(Continued)

FOREIGN PATENT DOCUMENTS

| JP | H11-63622 A | 3/1999 |
| JP | 2004-69273 A | 3/2004 |

(Continued)

OTHER PUBLICATIONS

International Search Report issued in corresponding International Application No. PCT/JP2018/0022662, dated Apr. 10, 2018, with English translation.

*Primary Examiner* — Santosh R Poudel
(74) *Attorney, Agent, or Firm* — McDermott Will & Emery LLP (57) ABSTRACT

An environment control system includes: a second storage unit storing a fluid model inside a space; a second communication unit configured to obtain temperature information inside the space and an operation state of an air conditioner provided in the space; an estimation unit configured to estimate a three-dimensional environmental distribution inside the space, based on the fluid model stored in the second storage unit, the obtained fluid parameter information, and the obtained operation state; and a control unit configured to control the air conditioner, based on the estimated three-dimensional environmental distribution.

6 Claims, 5 Drawing Sheets

(51) Int. Cl.
| | |
|---|---|
| *F24F 11/49* | (2018.01) |
| *F24F 13/06* | (2006.01) |
| *F24F 13/26* | (2006.01) |
| *F24F 13/32* | (2006.01) |
| *G05B 17/02* | (2006.01) |
| *G05B 13/04* | (2006.01) |

(58) Field of Classification Search
CPC ........ F24F 13/26; F24F 13/32; F24F 2110/10; F24F 11/64; F24F 11/62; G05D 23/1917
See application file for complete search history.

(56) References Cited

U.S. PATENT DOCUMENTS

| | | | |
|---|---|---|---|
| 2017/0153032 A1* | 6/2017 | Ashgriz | F24F 11/62 |
| 2018/0082204 A1* | 3/2018 | Iwamasa | G05B 17/02 |
| 2018/0101639 A1* | 4/2018 | Nanda | G06N 5/022 |
| 2019/0017721 A1* | 1/2019 | Motodani | F24F 11/64 |

FOREIGN PATENT DOCUMENTS

| | | |
|---|---|---|
| JP | 2006-78009 A | 3/2006 |
| JP | 2009-281626 A | 12/2009 |
| JP | 2012-42198 A | 3/2012 |
| JP | 2012-237484 A | 12/2012 |
| JP | 2013-002671 A | 1/2013 |
| JP | 2013-72633 A | 4/2013 |
| JP | 2016-61447 A | 4/2016 |
| WO | 2016/56051 A1 | 4/2016 |

\* cited by examiner

ENVIRONMENT CONTROL SYSTEM AND ENVIRONMENT CONTROL METHOD

CROSS-REFERENCE OF RELATED APPLICATIONS

This application is the U.S. National Phase under 35 U.S.C. § 371 of International Patent Application No. PCT/JP2018/002262, filed on Jan. 25, 2018, which in turn claims the benefit of Japanese Application No. 2017-063890, filed on Mar. 28, 2017, the entire disclosures of which Applications are incorporated by reference herein.

TECHNICAL FIELD

The present invention relates to an environment control system and an environment control method.

BACKGROUND ART

Methods of simulating a distribution of temperature and the like in a space have been proposed conventionally. PTL 1 discloses a method of simulating a blown-out air flow distribution.

CITATION LIST

Patent Literature

PTL 1: Japanese Unexamined Patent Application Publication No. 2009-281626

SUMMARY OF THE INVENTION

Technical Problem

It is difficult to have a target environmental state at a given position in a space. For example, in the case of air-conditioning a space by an air conditioner, the air-conditioning is performed based on the temperature or humidity detected by a sensor included in the air conditioner. Thus, it is difficult to set a target temperature or a target humidity at a position where no sensor is located in the space.

The present invention provides an environment control system and an environment control method that can bring an environmental state at a given position in a space closer to a target environmental state.

Solution to Problem

An environment control system according to an aspect of the present invention includes: a storage unit storing a fluid model inside a space; an obtainment unit configured to obtain fluid parameter information inside the space and an operation state of at least one appliance provided in the space; an estimation unit configured to estimate a three-dimensional environmental distribution inside the space, based on the fluid model stored in the storage unit, the fluid parameter information obtained, and the operation state obtained; and a control unit configured to control the at least one appliance, based on the three-dimensional environmental distribution estimated.

An environment control method according to an aspect of the present invention is an environment control method performed by an environment control system that includes a storage unit storing a fluid model inside a space, the environment control method including: obtaining fluid parameter information inside the space and an operation state of at least one appliance provided in the space; estimating a three-dimensional environmental distribution inside the space, based on the fluid model stored in the storage unit, the fluid parameter information obtained, and the operation state obtained; and controlling the at least one appliance, based on the three-dimensional environmental distribution estimated.

Advantageous Effect of Invention

The environment control system and the environment control method according to an aspect of the present invention can bring an environmental state at a given position in a space closer to a target environmental state.

DESCRIPTION OF EXEMPLARY EMBODIMENT

An embodiment will be described below, with reference to drawings. The embodiment described below shows a general or specific example. The numerical values, shapes, materials, structural elements, the arrangement and connection of the structural elements, steps, the processing order of the steps etc. shown in the following embodiment are mere examples, and do not limit the scope of the present invention. Of the structural elements in the embodiment described below, the structural elements not recited in any one of the independent claims representing the broadest concepts are described as optional structural elements.

Each drawing is a schematic and does not necessarily provide precise depiction. The substantially same structural elements are given the same reference marks throughout the drawings, and repeated description may be omitted or simplified.

Embodiment

[Overview of Environment Control System]

Figure 1:
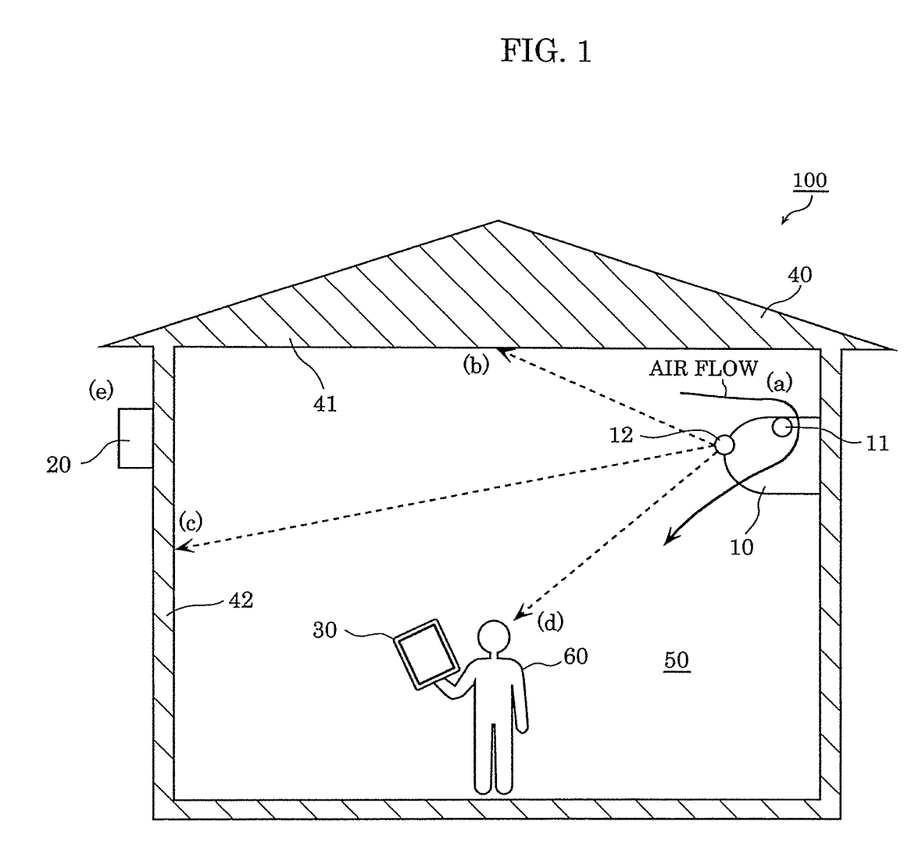
FIG. 1 is a diagram schematically illustrating an environment control system according to an embodiment.
Figure 2:
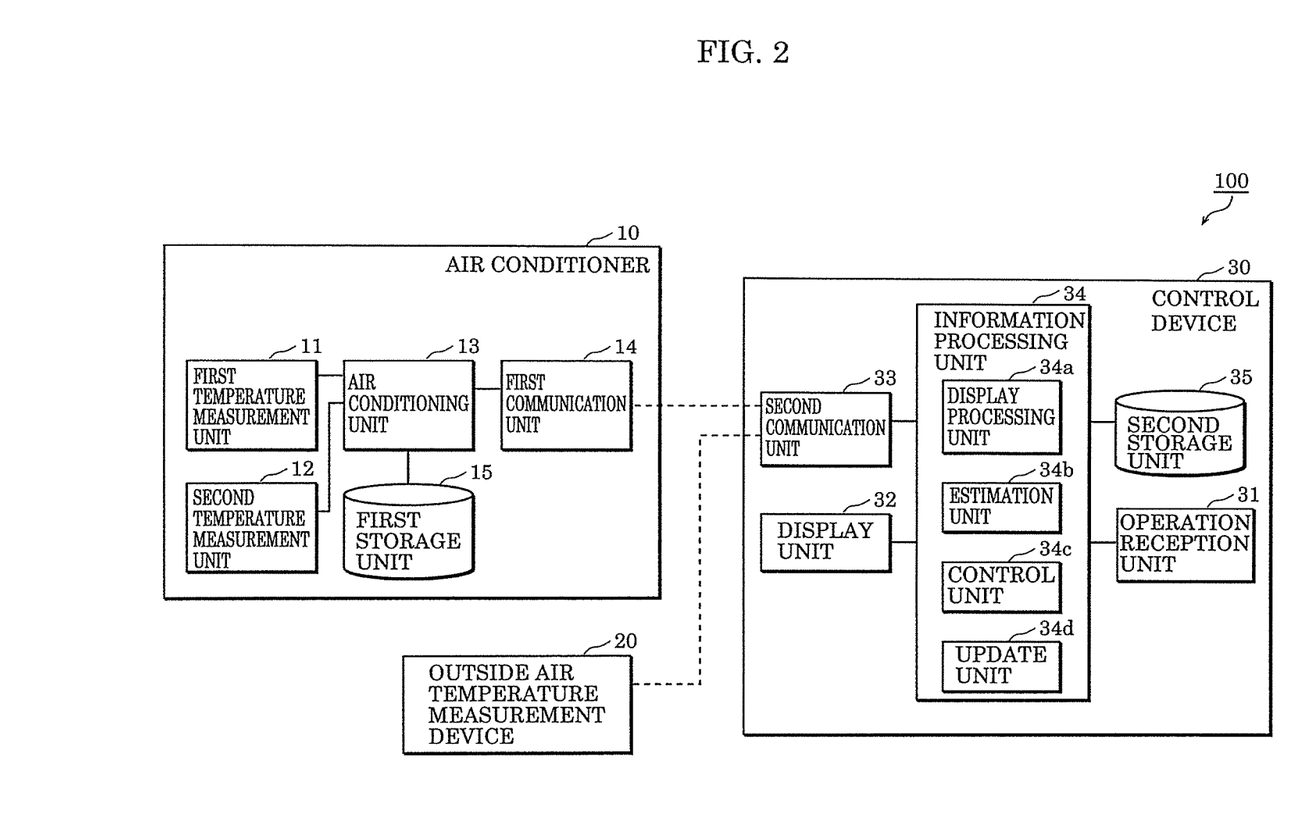
FIG. 2 is a block diagram illustrating the functional structure of the environment control system according to the embodiment.

The overall structure of an environment control system according to an embodiment will be described below. FIG. 1 is a diagram schematically illustrating the environment control system according to the embodiment. FIG. 2 is a block diagram illustrating the functional structure of the environment control system according to the embodiment.

As illustrated in FIGS. 1 and 2, environment control system 100 is a system in which, by user 60 operating control device 30, air conditioner 10 can be controlled to set a target temperature at a given position in space 50. Environment control system 100 includes air conditioner 10, outside air temperature measurement device 20, and control device 30. Each of the devices will be described below.

[Air Conditioner]

Air conditioner 10 is a device that adjusts the temperature in space 50 surrounded by building 40 by performing at least one of cooling and heating. Air conditioner 10 is located in space 50. Specifically, air conditioner 10 includes first temperature measurement unit 11, second temperature measurement unit 12, air conditioning unit 13, first communication unit 14, and first storage unit 15.

First temperature measurement unit 11 is attached to, for example, a suction port for sucking in air in space 50, and measures the temperature in space 50. In other words, first temperature measurement unit 11 measures the temperature at point (a) in FIG. 1. Specifically, first temperature measurement unit 11 is a device including an element for temperature measurement such as a thermistor or a thermocouple.

Second temperature measurement unit 12 measures the temperature of the surface of ceiling 41, the surface of wall 42, and the like of building 40. In other words, second temperature measurement unit 12 measures the temperature at point (b) and the temperature at point (c) in FIG. 1. Second temperature measurement unit 12 also measures the temperature in the vicinity of user 60. In other words, second temperature measurement unit 12 measures the temperature at point (d) in FIG. 1. Specifically, second temperature measurement unit 12 is a thermal image sensor including a plurality of infrared detectors.

Air conditioning unit 13 performs air-conditioning (cooling and heating) indoors, based on a control signal received by first communication unit 14. Air conditioning unit 13 also causes first communication unit 14 to transmit temperature information indicating the temperature measured by first temperature measurement unit 11 and temperature information indicating the temperature measured by second temperature measurement unit 12. Air conditioning unit 13 further causes first communication unit 14 to transmit operation state information (hereafter also simply referred to as "operation state") indicating the current operation state. Specifically, the operation state includes operation mode, set temperature, wind direction, air volume, etc.

Air conditioning unit 13 is specifically implemented by a processor, a microcomputer, or a dedicated circuit. Air conditioning unit 13 may be implemented by a combination of two or more of a processor, a microcomputer, and a dedicated circuit.

First communication unit 14 is a communication module (communication circuit) for air conditioner 10 to communicate with control device 30. For example, first communication unit 14 receives a control signal from control device 30. First communication unit 14 also transmits temperature information or, operation state information to control device 30. Communication between air conditioner 10 and control device 30 may be wired communication or wireless communication. Communication may be performed by any communication standard.

First storage unit 15 is a storage device storing a control program executed by air conditioning unit 13 and the like. Specifically, first storage unit 15 is implemented by semiconductor memory or the like.

[Outside Air Temperature Measurement Device]

Outside air temperature measurement device 20 is a device that is attached to an outer wall of building 40 or the like and measures outside air temperature around building 40. In other words, outside air temperature measurement device 20 measures the temperature at point (e) in FIG. 1. Specifically, outside air temperature measurement device 20 is a device including a temperature measurement element such as a thermistor or a thermocouple.

Outside air temperature measurement device 20 includes a communication module (communication circuit) for communicating with control device 30, and transmits temperature information indicating the outside air temperature to control device 30.

[Control Device]

Control device 30 is a device operated by user 60 to control air conditioner 10. For example, control device 30 is a tablet terminal. Control device 30 may be any other portable information terminal such as a smartphone. Control device 30 may be a stationary information terminal such as a personal computer. Control device 30 may be a dedicated control device corresponding to air conditioner 10. Specifically, control device 30 includes operation reception unit 31, display unit 32, second communication unit 33, information processing unit 34, and second storage unit 35.

Operation reception unit 31 is a user interface that receives operation of user 60. In the case where control device 30 is a tablet terminal, operation reception unit 31 is a graphical user interface (GUI) including a touch panel. The specific form of operation reception unit 31 is not limited. In the case where control device 30 is a personal computer, operation reception unit 31 is a keyboard, a mouse, and the like.

Display unit 32 displays an image or the like subjected to user operation, based on control of display processing unit 34a. Specifically, display unit 32 is implemented by a liquid crystal panel, an organic EL panel, or the like.

Second communication unit 33 is a communication module (communication circuit) for control device 30 to communicate with air conditioner 10 and outside air temperature measurement device 20. Second communication unit 33 is an example of an obtainment unit. For example, second communication unit 33 obtains the temperature information inside space 50 indicating the temperature measured by each of first temperature measurement unit 11 and second temperature measurement unit 12 in air conditioner 10. Second communication unit 33 also obtains the operation state of air conditioner 10 located in space 50. Second communication unit 33 obtains the temperature information outside space 50 (outside air temperature information) indicating the temperature measured by outside air temperature measurement device 20.

Second communication unit 33 transmits a control signal to air conditioner 10 based on control of control unit 34c, when operation reception unit 31 receives operation of user 60. Communication between control device 30 and air conditioner 10 and communication between control device 30 and outside air temperature measurement device 20 may each be wired communication or wireless communication. Communication may be performed by any communication standard.

Information processing unit 34 performs various information processing relating to the operation of control device 30. Specifically, information processing unit 34 is implemented by a processor, a microcomputer, or a dedicated circuit. Information processing unit 34 may be implemented by a combination of two or more of a processor, a microcomputer, and a dedicated circuit. Specifically, information processing unit 34 includes display processing unit 34a, estimation unit 34b, control unit 34c, and update unit 34d.

Display processing unit 34a generates a video signal for displaying an image subjected to operation of user 60, and outputs the generated video signal to display unit 32. Consequently, display unit 32 displays the image.

Estimation unit 34b estimates a three-dimensional temperature distribution (three-dimensional temperature unevenness) in space 50, based on a fluid model stored in second storage unit 35, the temperature information obtained by second communication unit 33, and the operation state of air conditioner 10 obtained by second communication unit 33.

Control unit 34c controls air conditioner 10, based on the estimated three-dimensional temperature distribution. Specifically, control unit 34c causes second communication unit 33 to transmit a control signal, to control air conditioner 10.

Update unit 34d updates the fluid model stored in second storage unit 35.

Second storage unit 35 is a storage device storing the fluid model. Second storage unit 35 may store information indicating the temperature measurement positions (the positions of points (a) to (e) in FIG. 1). Specifically, second storage unit 35 is implemented by semiconductor memory or the like.

In the embodiment, the fluid model stored in second storage unit 35 is a numerical fluid dynamic model (thermal fluid dynamic model) read by estimation unit 34b and used to estimate the three-dimensional temperature distribution. In other words, the fluid model stored in second storage unit 35 is an algorithm that receives the temperature information obtained by second communication unit 33 as an input parameter and outputs the three-dimensional temperature distribution inside space 50. This fluid model is customized to building 40, i.e. space 50, and is empirically or experimentally adjusted beforehand based on the size, shape, etc. of space 50.

[Operation]

Figure 3:
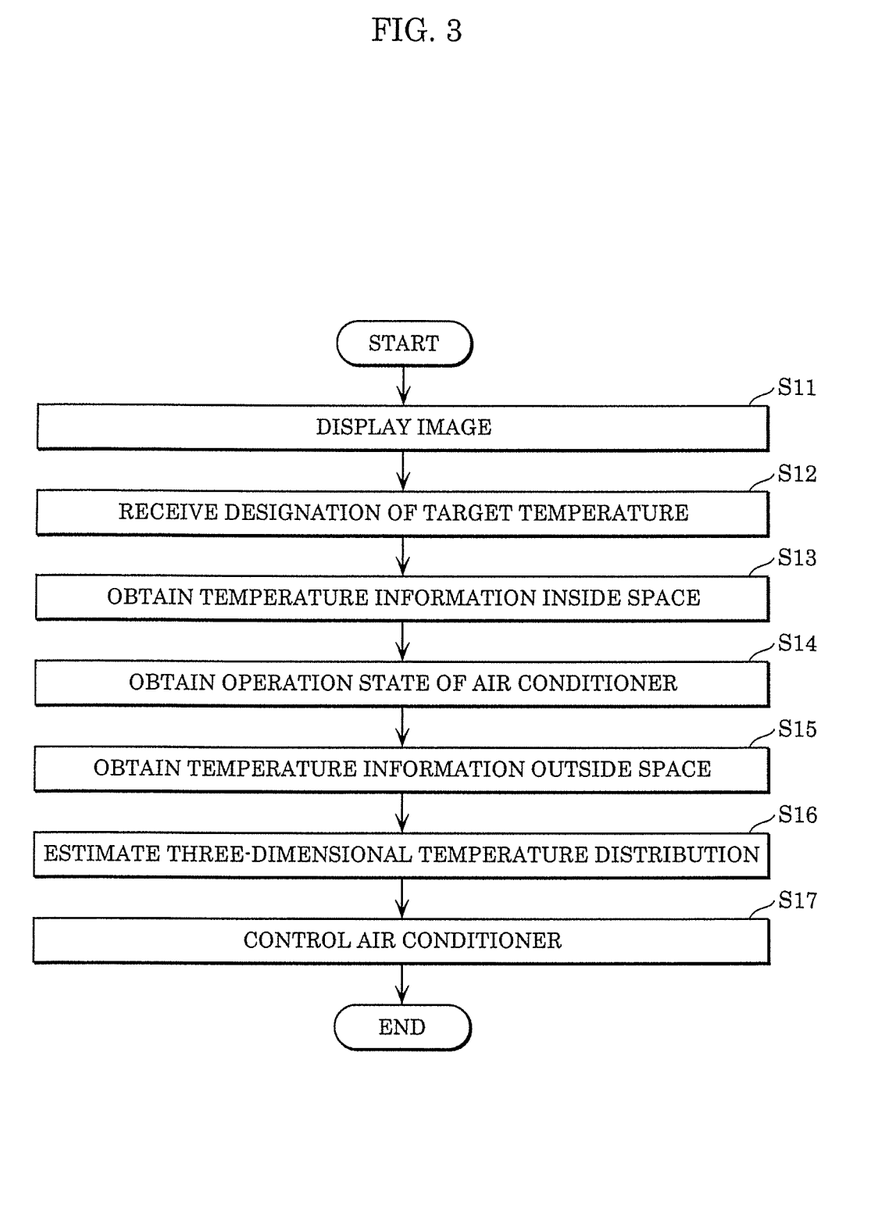
FIG. 3 is a flowchart of operation of the environment control system according to the embodiment.

Operation of environment control system 100 will be described below. FIG. 3 is a flowchart of operation of environment control system 100. The temperature measurement positions, etc. used in the following description are examples.

Figure 4:
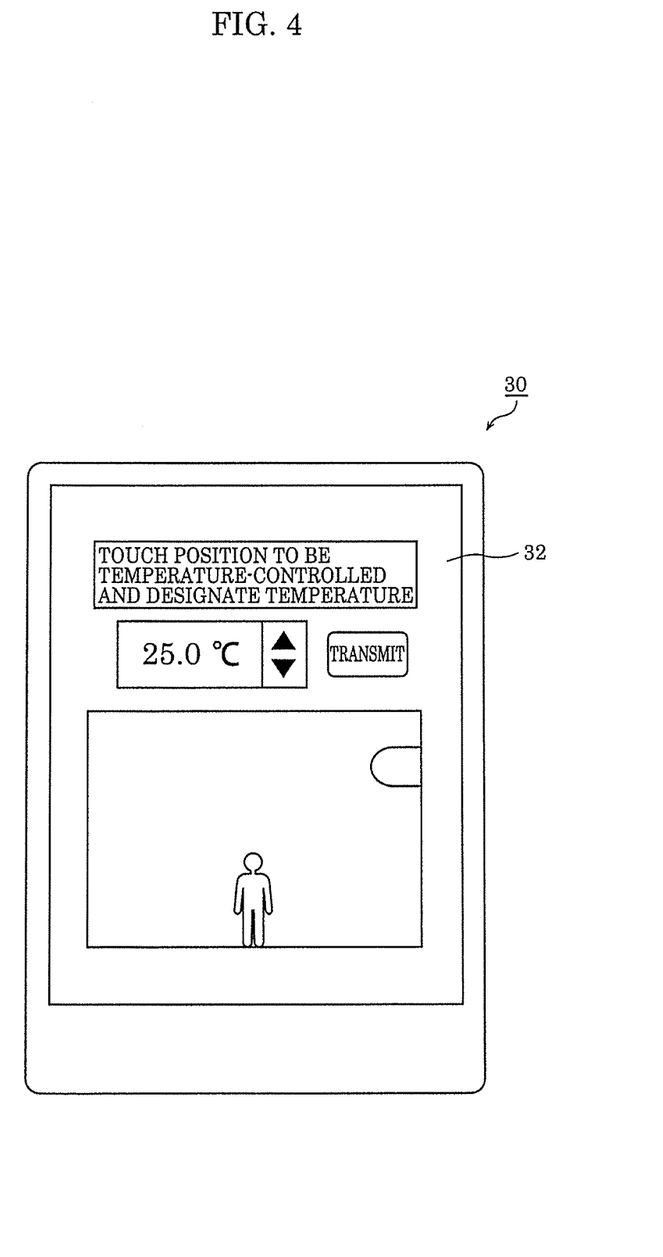
FIG. 4 is a diagram illustrating an example of an image subjected to user operation.

First, display processing unit 34a causes display unit 32 to display an image subjected to operation of user 60 (S11). FIG. 4 is a diagram illustrating an example of an image subjected to operation of user 60. For example, user 60 taps a given point in a schematic diagram illustrating space 50, which is included in the image illustrated in FIG. 4. User 60 also designates a target temperature at the tapped point, through the image.

Operation reception unit 31 receives this operation of user 60. That is, operation reception unit 31 receives the designation of the target temperature at the given position in space 50 (S12). Once operation reception unit 31 has received the designation of the target temperature, estimation unit 34b starts the estimation of the three-dimensional temperature distribution.

For example, estimation unit 34b causes second communication unit 33 to transmit a request for the temperature information to air conditioner 10. When such a request is received by first communication unit 14 in air conditioner 10, air conditioning unit 13 causes first communication unit 14 to transmit the temperature information indicating the current temperatures measured by first temperature measurement unit 11 and second temperature measurement unit 12 (the temperature information inside space 50 indicating the temperatures at points (a) to d) in FIG. 1). Second communication unit 33 thus obtains the temperature information inside space 50 transmitted from first communication unit 14 (S13).

For example, estimation unit 34b causes second communication unit 33 to transmit a request for the operation state to air conditioner 10. When such a request is received by first communication unit 14 in air conditioner 10, air conditioning unit 13 causes first communication unit 14 to transmit the current operation state. Second communication unit 33 thus obtains the operation state of air conditioner 10 transmitted from first communication unit 14 (S14).

For example, estimation unit 34b causes second communication unit 33 to transmit a request for the temperature information to outside air temperature measurement device 20. When such a request is received by outside air temperature measurement device 20, outside air temperature measurement device 20 transmits the temperature information indicating the current outside air temperature (the temperature information outside space 50 indicating the temperature at point (e) in FIG. 1). Second communication unit 33 thus obtains the temperature information outside space 50 transmitted from outside air temperature measurement device 20 (S15). Second communication unit 33 may not necessarily obtain the temperature information outside space 50, that is, Step S15 may be omitted.

Estimation unit 34b reads the fluid model stored in second storage unit 35. Estimation unit 34b estimates the three-dimensional temperature distribution inside space 50, based on the read fluid model, the temperature information inside space 50 obtained in Step S13, the operation state of air conditioner 10 obtained in Step S14, and the temperature information outside space 50 obtained in Step S15 (S16).

Figure 5:
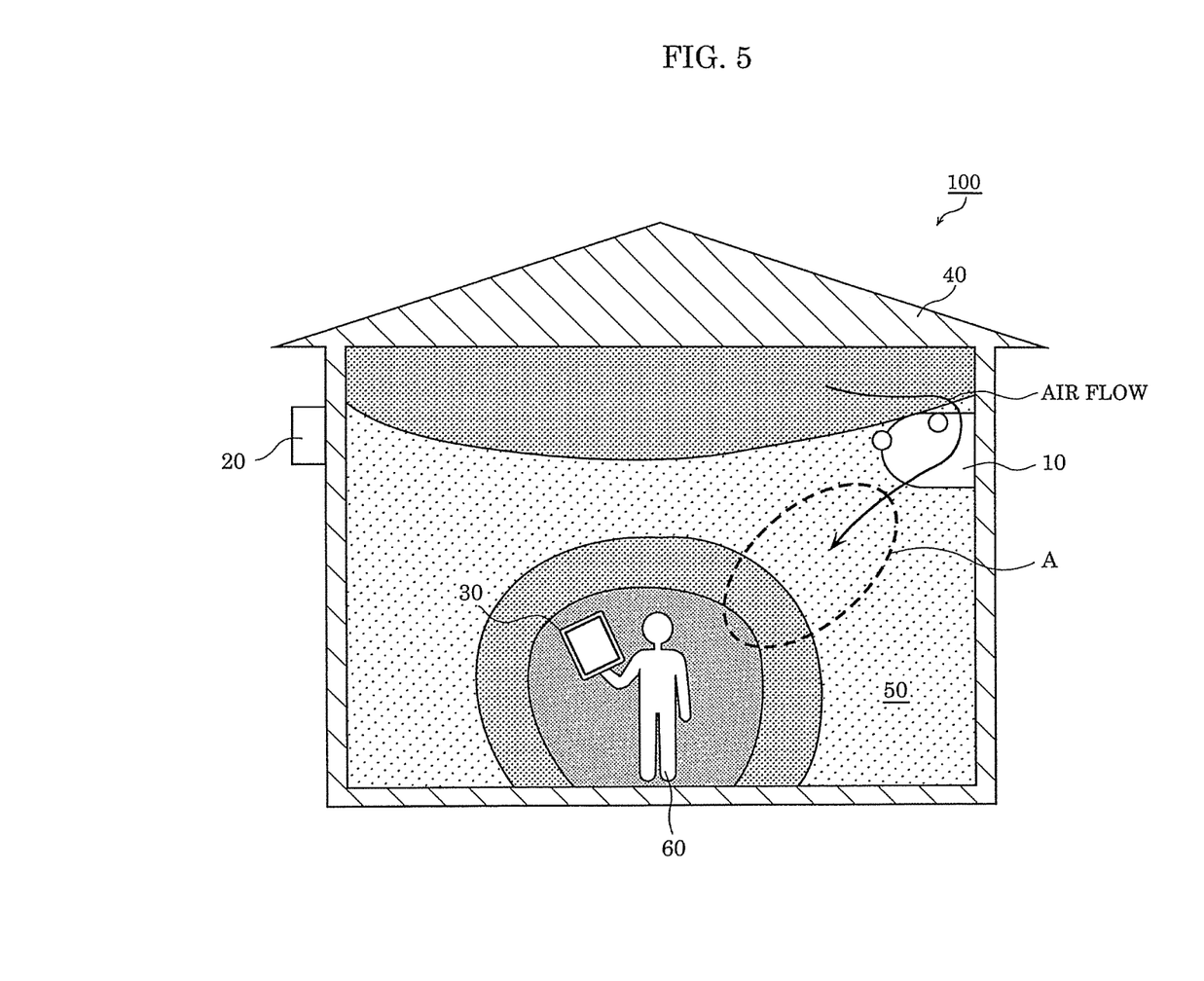
FIG. 5 is a diagram illustrating correction of a three-dimensional temperature distribution.

In Step S16, estimation unit 34b corrects the three-dimensional temperature distribution estimated based on the fluid model, the temperature information inside space 50, and the temperature information outside space 50, using the operation state of air conditioner 10. FIG. 5 is a diagram illustrating the correction of a three-dimensional temperature distribution.

FIG. 5 schematically illustrates a three-dimensional temperature distribution not based on the operation state of air conditioner 10, by dot hatching. For example, region A directly exposed to wind from air conditioner 10 is significantly influenced by wind from air conditioner 10. Accordingly, estimation unit 34b corrects the three-dimensional temperature distribution based on the operation state of air conditioner 10 (set temperature, wind direction, air volume, etc.). Specifically, estimation unit 34b determines region A significantly influenced by wind based on the wind direction from air conditioner 10, and corrects the three-dimensional temperature distribution of region A based on the set temperature and the air volume of air conditioner 10. Moreover, for a region farther from region A, estimation unit 34b performs correction with a smaller degree of influence of the operation state of air conditioner 10. Thus, estimation unit 34b can improve the estimation accuracy of the three-dimensional temperature distribution.

The fluid model stored in second storage unit 35 may be a fluid model including the operation state of air conditioner 10 as an input parameter. In this case, a three-dimensional temperature distribution based on the operation state of air conditioner 10 is directly estimated.

After this, control unit 34c controls air conditioner 10 based on the three-dimensional temperature distribution estimated in Step S16 (S17). Specifically, control unit 34c controls air conditioner 10 based on the three-dimensional temperature distribution estimated in Step S16, to bring the given position designated in Step S12 closer to the target temperature.

As described above, environment control system 100 can, as a result of estimating the three-dimensional temperature distribution, control air conditioner 10 for the temperature at a position where no temperature sensor is located. Thus, environment control system 100 can bring the environmental state at a given position in space 50 to the target environmental state.

In Step S16, a C value indicating the airtightness of space 50 may be used to estimate the three-dimensional temperature distribution. In this case, before Step S16, the C value may be obtained by second communication unit 33 from an external device such as a management device (server device) for managing the C value, or input by means of operation received by operation reception unit 31. In the case where the C value is input, operation reception unit 31 functions as an obtainment unit.

[Variation 1]

The temperature information and the three-dimensional temperature distribution used in the foregoing embodiment are respectively an example of fluid parameter information and an example of a three-dimensional environmental distribution. In environment control system 100, for example, humidity, wind speed, airborne particle concentration, or radiant heat may be used as the fluid parameter information. The three-dimensional environmental distribution may be a three-dimensional humidity distribution, a three-dimensional wind speed distribution, a three-dimensional particle concentration distribution, or a three-dimensional radiant heat distribution.

For example, in the case where the fluid parameter information is humidity, control device 30 obtains humidity information from a humidity sensor located inside space 50 (or outside space 50), and estimates a three-dimensional humidity distribution using a fluid model for calculating the three-dimensional humidity distribution.

In the case where the fluid parameter information is wind speed, control device 30 obtains wind speed information from an anemometer located inside space 50 (or outside space 50), and estimates a three-dimensional wind speed distribution using a fluid model for calculating the three-dimensional wind speed distribution. In the case where the fluid parameter information is airborne particle concentration, control device 30 obtains airborne particle concentration information from an airborne particle concentration meter located inside space 50 (or outside space 50), and estimates a three-dimensional particle concentration distribution using a fluid model for calculating the three-dimensional particle concentration distribution. In the case where the fluid parameter information is radiant heat, control device 30 obtains radiant heat information from a radiometer (heat flux sensor) located inside space 50 (or outside space 50), and estimates a three-dimensional radiant heat distribution using a fluid model for calculating the three-dimensional radiant heat distribution.

[Variation 2]

In the embodiment, a numerical fluid dynamic model is used as the fluid model. The fluid model is, however, not limited to a numerical fluid dynamic model, and may be any model for calculating a three-dimensional environmental distribution. For example, the fluid model stored in second storage unit 35 may be a fluid model determined as a result of machine learning in space 50, or a fluid model determined based on a history of three-dimensional environmental distributions measured in space 50.

The fluid model stored in second storage unit 35 may be a fluid model determined based on a history of three-dimensional environmental distributions measured in a space (e.g. a space environmentally very similar to space 50) different from space 50. For example, a fluid model of one room (space) in an apartment house may be applied to another room (space) in the apartment house.

The fluid model stored in second storage unit 35 may be implemented as big data. In this case, estimation unit 34*b* determines the three-dimensional environmental distribution corresponding to the obtained fluid parameter information and the obtained operation state, with reference to the big data.

In this case, environment control system 100 is implemented, for example, as a server-client system. Control device 30 functions as a client device including structural elements such as operation reception unit 31, display unit 32, display processing unit 34*a*, and control unit 34*c* described above. Control device 30 has a function as a remote control (user interface) of air conditioner 10. Environment control system 100 includes a server device besides control device 30. The server device includes structural elements for performing the estimation, such as estimation unit 34*b*, update unit 34*d*, and second storage unit 35. Second storage unit 35 stores big data. The big data may be generated in any way. For example, the big data may be big data based on a history of three-dimensional environmental distributions measured in space 50, or big data determined based on a history of three-dimensional environmental distributions measured in a space (e.g. a space environmentally very similar to space 50) different from space 50.

[Variation 3]

The fluid model stored in second storage unit 35 may be updated by update unit 34*d*. For example, update unit 34*d* may update the fluid model stored in second storage unit 35, based on a history of environmental state distributions inside space 50. In the case where the fluid model stored in second storage unit 35 is a fluid model determined based on a history of three-dimensional environmental distributions in a space different from space 50 as mentioned above, update unit 34*d* may update the fluid model based on a history of environmental distributions in the space different from space 50. Update unit 34*d* may update the fluid model by machine learning.

[Variation 4]

In the foregoing embodiment, control unit 34*c* controls one air conditioner 10. Alternatively, control unit 34*c* may control a plurality of air conditioners 10. Control unit 34*c* controls at least one appliance that is provided in space 50 and harmonizes (adjusts) the environment inside space 50. Examples of the at least one appliance that harmonizes (adjusts) the environment inside space 50 include a halogen heater, a humidifier, and an air purifier. Control unit 34*c* may control a plurality of types of appliances such as those listed above.

Likewise, second communication unit 33 obtains the operation state of the at least one appliance that is provided in space 50 and harmonizes the environment inside space 50. The operation state of the appliance may be obtained from the appliance or from a control device that controls the appliance, such as a home energy management system (HEMS) controller. Control unit 34*c* may obtain the operation states of a plurality of types of appliances.

[Advantageous Effects, Etc.]

As described above, environment control system 100 includes: second storage unit 35 storing a fluid model inside space 50; second communication unit 33 that obtains fluid parameter information inside space 50 and an operation state of at least one appliance provided in space 50; estimation unit 34*b* that estimates a three-dimensional environmental distribution inside space 50, based on the fluid model stored in second storage unit 35, the obtained fluid parameter information, and the obtained operation state; and control unit 34c that controls the at least one appliance, based on the estimated three-dimensional environmental distribution. Second communication unit 33 is an example of an obtainment unit, and the at least one appliance is, for example, air conditioner 10.

Thus, environment control system 100 can bring the environmental state at a given position in space 50 closer to a target environmental state. Moreover, environment control system 100 can estimate the three-dimensional environmental distribution that reflects the operation state of the appliance.

Environment control system 100 may further include: operation reception unit 31 that receives designation of a target environmental state at a given position in space 50. Control unit 34c may control the at least one appliance based on the estimated three-dimensional environmental distribution, to bring the environmental state at the given position closer to the target environmental state. Operation reception unit 31 is an example of a reception unit.

Thus, environment control system 100 can bring the environmental state at the given position in space 50 closer to the designated environmental state.

Second communication unit 33 may further obtain an environmental state outside space 50. Estimation unit 34b may estimate the three-dimensional environmental distribution, based on the fluid model stored in second storage unit 35, the obtained fluid parameter information, the obtained operation state, and the obtained environmental state outside space 50.

Thus, environment control system 100 can estimate the three-dimensional environmental distribution that reflects the environmental state outside space 50.

Second communication unit 33 may further obtain a C value indicating airtightness of space 50. Estimation unit 34b may estimate the three-dimensional environmental distribution, based on the fluid model stored in second storage unit 35, the obtained fluid parameter information, the obtained operation state, and the obtained C value Thus, environment control system 100 can estimate the three-dimensional environmental distribution that reflects the C value of space 50.

The fluid model may be a thermal fluid dynamic model, the fluid parameter information may be temperature information, and the at least one appliance may include air conditioner 10. Estimation unit 34b may estimate a three-dimensional temperature distribution inside space 50 as the three-dimensional environmental distribution, based on the fluid model, the obtained temperature information, and the obtained operation state. Control unit 34c may control air conditioner 10, based on the estimated three-dimensional temperature distribution.

Thus, environment control system 100 can bring the given position in space 50 to the target temperature state. Moreover, environment control system 100 can estimate the three-dimensional temperature distribution that reflects the operation state of the appliance.

Environment control system 100 may further include: update unit 34d that updates the fluid model stored in second storage unit 35 based on a history of an environmental state distribution in space 50.

By updating the fluid model based on a history of environmental distributions in space 50, the estimation accuracy of the three-dimensional temperature distribution can be enhanced.

Environment control system 100 may further include: update unit 34d that updates the fluid model stored in second storage unit 35 based on a history of an environmental distribution in a space different from space 50.

By updating the fluid model based on a history of environmental distributions in a space different from space 50, the estimation accuracy of the three-dimensional temperature distribution can be enhanced.

Environment control system 100 may further include: update unit 34d that updates the fluid model stored in second storage unit 35 by machine learning.

By updating the fluid model by machine learning, the estimation accuracy of the three-dimensional temperature distribution can be enhanced.

An environment control method performed by environment control system 100 that includes second storage unit 35 storing a fluid model inside space 50, includes: obtaining fluid parameter information inside space 50 and an operation state of at least one appliance provided in space 50; estimating a three-dimensional environmental distribution inside space 50, based on the fluid model stored in second storage unit 35, the obtained fluid parameter information, and the obtained operation state; and controlling the at least one appliance, based on the estimated three-dimensional environmental distribution.

Thus, environment control system 100 can bring the environmental state at a given position in space 50 closer to a target environmental state. Moreover, environment control system 100 can estimate the three-dimensional environmental distribution that reflects the operation state of the appliance.

Other Embodiments

While the environment control system according to the embodiment has been described above, the present invention is not limited to the foregoing embodiment.

For example, the communication method between devices in the foregoing embodiment is not limited. In the case where wireless communication is performed between devices, the wireless communication method (communication standard) is, for example, specific low-power radio using frequencies in 920 MHz band, such as Zigbee®, Bluetooth®, or wireless local area network (LAN). The communication between devices may be wired communication instead of wireless communication. Specifically, wired communication is power line communication (PLC), communication using wired LAN, or the like.

In the foregoing embodiment, for example, a process performed by a specific processing unit may be performed by another processing unit. The order of a plurality of processes may be changed, and a plurality of processes may be performed in parallel.

The division of the structural elements of the environment control system into the plurality of devices is an example. For example, the environment control system may be implemented as a client-server system, where the structural elements included in the control device in the foregoing embodiment are divided between the server device and the client device. Specifically, of the structural elements included in the control device, the structural elements used to estimate the three-dimensional environmental distribution may be included in the server device, and the other structural elements in the client device.

Each of the structural elements such as information processing units in each of the foregoing embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory.

The structural elements such as information processing units may be circuits (or integrated circuits). These circuits may constitute one circuit as a whole, or may be separate circuits. These circuits may each be a general-purpose circuit or a dedicated circuit.

These general and specific aspects of the present invention may be implemented using a system, a device, a method, an integrated circuit, a computer program, or a computer-readable recording medium such as CD-ROM, or any combination of systems, devices, methods, integrated circuits, computer programs, and recording media. For example, in the case where a general-purpose information terminal such as a smartphone or a tablet terminal is used as a control device, the present invention may be implemented as an application program for causing an information terminal (computer) to function as a control device. The present invention may be implemented as an environment control method performed by an environment control system (computer). The present invention may be implemented as a control device included in an environment control system.

Other modifications obtained by applying various changes conceivable by a person skilled in the art to each embodiment of the structural elements and functions in each embodiment without departing from the scope of the present invention are also included in the present invention.

REFERENCE MARKS IN THE DRAWINGS 10 air conditioner
31 operation reception unit (reception unit)
32 display unit
33 second communication unit (obtainment unit)
34b estimation unit
34c control unit
34d update unit
35 second storage unit (storage unit)
50 space
100 environment control system

The invention claimed is:

1. An environment control system, comprising:
   a storage unit storing a fluid model corresponding to a space;
   an obtainment unit configured to obtain fluid parameter information inside the space and an operation state of at least one appliance provided in the space;
   an estimation unit configured to estimate a three-dimensional environmental distribution inside the space, based on the fluid model stored in the storage unit, the fluid parameter information obtained, and the operation state obtained;
   a control unit configured to control the at least one appliance, based on the three-dimensional environmental distribution estimated; and
   an update unit configured to update the fluid model stored in the storage unit, based on a history of an environmental distribution inside an other space different from the space, instead of a history of an environmental distribution inside the space,
   wherein the space and the other space are mutually different rooms in a same apartment house.

2. The environment control system according to claim 1, further comprising:
   a reception unit configured to receive designation of a target environmental state at a given position in the space,
   wherein the control unit is configured to control the at least one appliance based on the three-dimensional environmental distribution estimated, to bring an environmental state at the given position closer to the target environmental state.

3. The environment control system according to claim 1, wherein the obtainment unit is configured to further obtain an environmental state outside the space, and
   the estimation unit is configured to estimate the three-dimensional environmental distribution, based on the fluid model stored in the storage unit, the fluid parameter information obtained, the operation state obtained, and the environmental state outside the space obtained.

4. The environment control system according to claim 1, wherein the obtainment unit is configured to further obtain a C value indicating airtightness of the space, and
   the estimation unit is configured to estimate the three-dimensional environmental distribution, based on the fluid model stored in the storage unit, the fluid parameter information obtained, the operation state obtained, and the C value obtained.

5. The environment control system according to claim 1, wherein the fluid model is a thermal fluid dynamic model,
   the fluid parameter information is temperature information,
   the at least one appliance includes an air conditioner,
   the estimation unit is configured to estimate a three-dimensional temperature distribution inside the space as the three-dimensional environmental distribution, based on the fluid model stored in the storage unit, the temperature information obtained, and the operation state obtained, and
   the control unit is configured to control the air conditioner, based on the three-dimensional temperature distribution estimated.

6. An environment control method performed by an environment control system that includes a storage unit storing a fluid model corresponding to a space, the environment control method comprising:
   obtaining fluid parameter information inside the space and an operation state of at least one appliance provided in the space;
   estimating a three-dimensional environmental distribution inside the space, based on the fluid model stored in the storage unit, the fluid parameter information obtained, and the operation state obtained;
   controlling the at least one appliance, based on the three-dimensional environmental distribution estimated; and
   updating the fluid model stored in the storage unit, based on a history of an environmental distribution inside an other space different from the space, instead of a history of an environmental distribution inside the space,
   wherein the space and the other space are mutually different rooms in a same apartment house.

* * * * *